MAGNETIC STORAGE DEVICE USING RE-ENTRANT HYSTERESIS MATERIALS
Filed June 29, 1962 4 Sheets-Sheet 1
FIG. 1
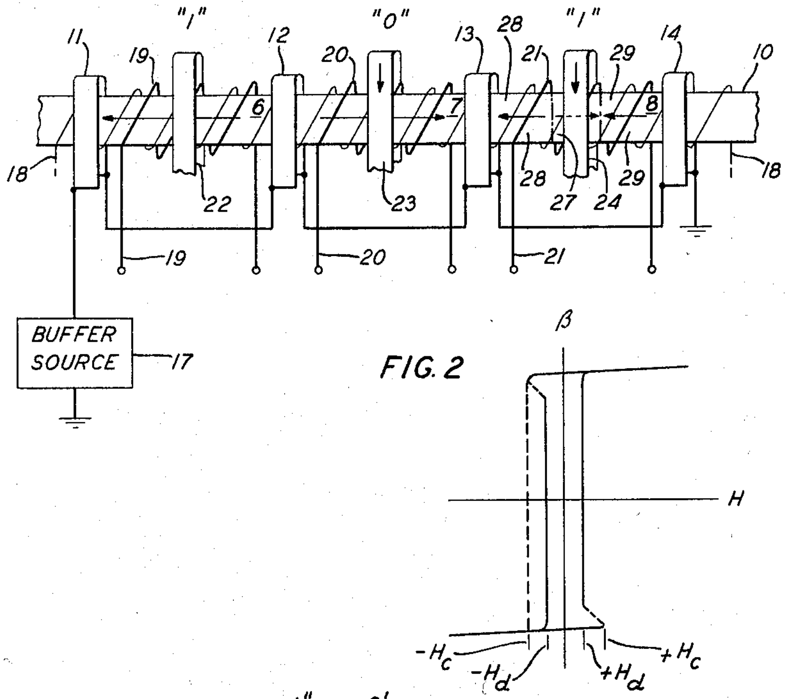
FIG. 1, FIG. 2
FIG. 3A
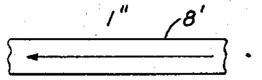
INITIAL STATE
FIG. 3B
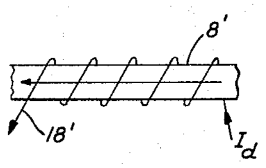
DIGIT FIELD ($H_d$) APPLIED
FIG. 3C
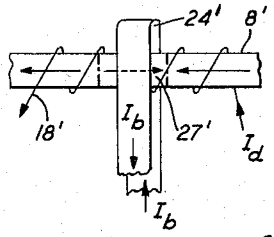
INTERROGATE (WORD LINE) FIELD ($H_c$) APPLIED CENTER SEGMENT REVERSED.
FIG. 3D
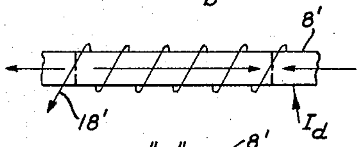
REVERSED SEGMENT EXPANDS THROUGH WALL MOTION UNDER INFLUENCE OF DIGIT FIELD.
FIG. 3E
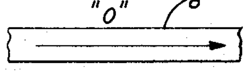
FINAL STATE
INVENTOR
U. F. GIANOLA
BY
Charles Scott Phelan
ATTORNEY INVENTOR
U. F. GIANOLA
BY
Charles Scott Phelan
ATTORNEY Nov. 15, 1966 U. F. GIANOLA 3,286,242

MAGNETIC STORAGE DEVICE USING RE-ENTRANT HYSTERESIS MATERIALS

Filed June 29, 1962 4 Sheets-Sheet 3

INVENTOR
U. F. GIANOLA
BY
Charles Scott Phelan
ATTORNEY

MAGNETIC STORAGE DEVICE USING RE-ENTRANT HYSTERESIS MATERIALS

Filed June 29, 1962 4 Sheets-Sheet 4

INVENTOR
U. F. GIANOLA
BY
Charles Scott Phelan
ATTORNEY

United States Patent Office 3,286,242

Patented Nov. 15, 1966

3,286,242
MAGNETIC STORAGE DEVICE USING RE-ENTRANT HYSTERESIS MATERIALS

Umberto F. Gianola, Florham Park, N.J., assignor to Bell Telephone Laboratories, Incorporated, New York, N.Y., a corporation of New York Filed June 29, 1962, Ser. No. 206,208
18 Claims. (Cl. 340—174)

This invention relates to a magnetic memory element, and more particularly it relates to such an element which is arranged to practice a new technique for writing information into magnetic storage elements.

Magnetic storage elements with rectangular hysteresis characteristics defining two stable conditions of magnetic remanence have long been used as devices for storing bits of information in a binary code system of representation. Each element stores a single information bit when it rests in one or the other of its stable conditions to represent a binary ONE or a ZERO, respectively. In one form, a plurality of such elements comprise a series of one-bit segments of a continuous magnetic wire, tape, or other elongated member. Each such segment in a member can have its own individual polarity of magnetization which is stable and independent of the magnetization polarity of adjacent segments of the member. Information may be written into a segment by applying a current pulse to a broad solenoid which engages the entire operative length of the one-bit segment, and this pulse is of the proper polarity for switching the segment to one or the other of its stable remanent conditions to represent a binary ONE or a binary ZERO. The segment is nondestructively interrogated by applying a read-out current pulse to a second solenoid which engages only a small part of the segment. The read-out pulse generates a field with a polarity in the ZERO direction so that the magnetization of the small portion is switched only if it had previously been in the ONE condition. Upon removal of the read-out pulse, the magnetization of the small portion is restored to the ONE condition by the demagnetization field emanating from the other segment portions that had not been switched by the read-out pulse. A sensing lead engages a plurality of storage segments in a magnetic memory array and couples to information utilization circuits the signals induced in the lead during interrogation operations.

In prior art systems such as that just outlined, at least three different types of circuits are required. One is the sensing circuit which engages a number of magnetic storage elements and is usually time gated, or strobed, in synchronism with interrogation signals. A second of the three circuit types is the write circuit; and each write circuit in an array usually engages a single storage element, unless the circuit is further subdivided into two coincident current circuits, for supplying write-in pulses. An access network is provided to scan the write circuits so that they may be supplied with pulses in accordance with a predetermined sequence. The third circuit type is the interrogation circuit which may also be individual to each element or subdivided into coincident current circuits and which also has an access network to enable scanning. The multiple access networks, one each for write and interrogation circuits, require equipment and circuit connection duplication which is costly and tends to pull down system reliability.

Accordingly, it is one object of the invention to facilitate the writing of information into magnetic memory arrays capable of nondestructive read-out operation.

An additional object is to increase the reliability of magnetic memory arrays.

Another object is to simplify magnetic storage elements so that information may be stored therein and nondestructively read therefrom in a simple and efficient manner.

A further object is to facilitate the use in large memory arrays of magnetic materials such as tapes and wires which include plural adjacent segments for storing discrete information bits.

Yet another object is to reduce the number of access circuits and electric circuit connections required for a magnetic memory.

It is still another object to allow single-bit writing into a three dimensional linear-selection memory without placing a restriction on the maximum amplitude of the word write current.

These and other objects of the invention are accomplished in an illustrative embodiment utilizing for each bit storage element of a magnetic memory array a magnetic material with an essentially rectangular hysteresis characteristic but with significant re-entrant switching portions in the characteristic. Thus, in order to initiate a switching operation a coercive magnetic field intensity $H_c$ is required for the path length of the flux which is to be switched, but a significantly smaller field intensity $H_d$ is adequate to carry to completion an already-initiated switching operation. Only two information-controlling circuits engage each element, and they are arranged to exploit the re-entrant hysteresis characteristic of the magnetic material for performing read and write operations with respect to the material.

Read operations may be nondestructively performed by interrogating a small, magnetically unstable, portion of the element with one of the circuits and sensing flux changes with the other circuit as described for the prior art. A write-in operation is performed by the same two circuits by applying the same interrogation signal to the same interrogation circuit with the desired polarity to switch only the interrogation zone of the element to the desired binary condition. A smaller signal applied to the sense circuit with the desired polarity expands the magnetic domain walls of the switched interrogation zone to include the entire storage element.

Plural magnetic storage elements utilizing the re-entrance of the hysteresis characteristic are arranged in an array wherein the interrogation and sense circuits perform as just described. A single access circuit scans the interrogation circuits of the elements in a sequence of elements, or groups of elements, for both the read and the write operations. Sense circuits for corresponding bit elements in each word group of an array are pulsed simultaneously during a write-in operation, and the same sense circuits drive output circuits which are all simultaneously strobed in synchronism with the interrogation signals during a read-out operation.

It is one feature of the invention that only two information controlling circuits, or solenoids, are required to operate a storage element in accordance with the invention for both write-in and read-out operations.

It is a further feature of the invention that the read-out sensing circuit of a memory array is also used for supplying one of the two coincident currents that are necessary for initiating and expanding a flux switch during a write-in operation.

It is another feature of the invention that the interrogation solenoid is also used for supplying one of the coincident currents required to accomplish a write-in operation so that only one access matrix is required for selecting word solenoids for use during both the read-out and the write-in operations.

A more complete understanding of the invention and its various objects and advantages may be obtained from the following detailed description when taken together with the appended claims and the attached drawings wherein:

FIG. 1 is a partial diagram of a group of prior art magnetic storage elements illustrating certain aspects thereof which are also used in the present invention and other aspects which are eliminated by the present invention;

FIG. 2 is a typical hysteresis diagram for a square loop magnetic material with re-entrant switching portions in the characteristic;

FIGS. 3A–3E illustrate the parts of the write-in operation of the invention;

Figure 4:
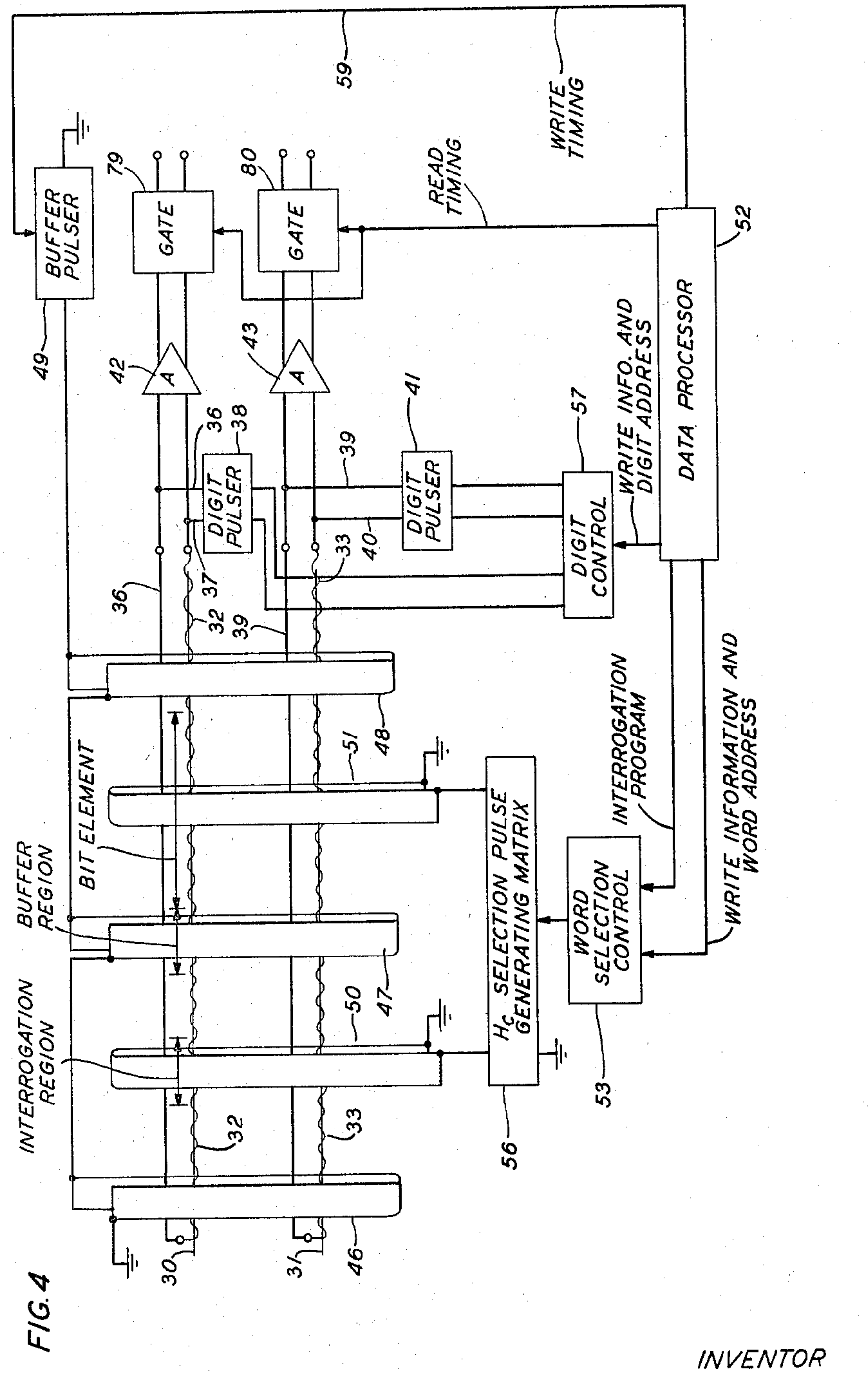
FIG. 4 is a diagram, partially in block and line form and partially in schematic form, of a magnetic memory array utilizing the invention.

FIG. 1 illustrates an example of prior art memory elements utilizing a continuous magnetic wire 10 for information storage purposes. Three one-bit segments 6, 7, and 8 of the wire are shown in the figure with the segments being in the binary ONE, ZERO, and ONE conditions, respectively. Buffer solenoids 11, 12, 13, and 14 are provided to separate the bit segments of magnetic wire 10 and receive buffer signals in series from a signal source 17. A digit wire 18 is helically wound around the entire length of magnetic wire 10 to constitute a sensing element in which signals are induced during interrogating operations. Digit lead 18 is shown as being tightly wound on magnetic wire 10 in order that it may be more clearly distinguished from the write-in solenoids 19, 20, and 21 which are shown as being loosely wound on the bit segments of wire 18. In practice, however, all windings are coupled as closely as possible to wire 10.

In order to write information into a particular one-bit segment of wire 10 a pulse of the appropriate polarity is applied to the write-in solenoid for the segment for accomplishing any needed switching of magnetization. Fields generated by current in the buffer solenoids restrict the switching operation to the desired segment of the wire.

Interrogation pulses are applied to interrogation solenoids 22, 23, and 24, which are only partially shown in FIG. 1, to initiate a read-out operation. These signals are usually applied in sequence to the solenoids by some suitable access circuitry such as a ring-type distributing circuit or a crosspoint matrix. The interrogation pulse applied to solenoid 23 in the direction indicated by the arrow thereon finds its storage segment 7 in the ZERO condition and generates a field in that segment which is also polarized in the ZERO direction so that no switching takes place as a result of that interrogation pulse. A similar pulse applied to solenoid 24 finds its segment 8 in the ONE condition and generates a field therein which is polarized in the ZERO direction thereby causing the portion 27 of segment 8 which is under the solenoid to be switched to the ZERO condition. This switching action induces a voltage in the sensing lead 18 to indicate that a switching operation has taken place in the segment 8 of the magnetic wire 10. Upon the termination of the interrogation pulse, the wire segment portions 28 and 29 on either side of the portion 27 apply demagnetizing fields to the latter portion and restore it to the initial ONE condition of magnetization.

It may be seen from FIG. 1 that each bit storage segment of the magnetic wire 10 must have, in addition to a sensing winding thereon, a write-in solenoid and an interrogation solenoid. Each of those solenoids is actuated by separate access, or addressing, circuits. If a two-dimensional array is required, an additional, or third, access circuit is required to select sense leads for coincident current writing.

FIG. 2 illustrates the re-entrant quasi-rectangular hysteresis characteristic of many magnetic materials which is utilized to advantage in accordance with the present invention to simplify magnetic storage elements. There are, for example, a number of ferrites and permalloy materials which exhibit this re-entrant hysteresis characteristic, but there are no doubt other materials also exhibiting the characteristic. One of the permalloy materials which displays a typical re-entrant characteristic is 4–79 molybdenum permalloy wire which includes 4 percent molybdenum, 79 percent nickel, and 17 percent iron.

The characteristic of FIG. 2 is substantially rectangular and defines two stable conditions of magnetic remanence between which the magnetic material may be repeatedly switched by the application of magnetic fields with a minimum initial intensity $H_c$ and with a polarity which is opposite to the existing remanent flux polarity. It has been observed, however, that magnetic materials, such as permalloy materials, have re-entrant hysteresis characteristics and require only a field intensity of $H_d$, which is less than $H_c$, for completing a switching operation once it has been initiated. In other words, if the magnetic material is initially subjected to a magnetomotive force of the intensity $H_c$, the starting field, a magnetic domain is quickly reversed to conform to the polarity of the newly applied field. Once this nucleation of a domain of reversed magnetization has occurred, the domain walls may be thereafter expanded under the influence of a lesser field intensity $H_d$, the maintaining field. A starting field $H_c$ and an expanding, or maintaining, field $H_d$ may be applied in at least partially coincident time slots to regions of different length along the wire in order to effect a permanent magnetization reversal. If either field were applied individually no permanent reversal would be effected because the $H_c$ field links only a magnetically unstable length of the wire and the field $H_d$ is of insufficient intensity.

FIGS. 3A through 3E illustrate the operations which take place in accordance with the invention when writing a ZERO into a segment 8′ of magnetic wire which is initially magnetized in the ONE condition. The wire is a magnetic type with substantially rectangular hysteresis characteristics which have re-entrant switching portions as shown in FIG. 2. FIG. 3A shows the initial state of the segment 8′ in the ONE condition. This corresponds to the condition of the similarly numbered segment in FIG. 1. In FIG. 3B a lead 18′ engaging the entire length of segment 8′ passes a current around the segment to apply a longitudinal magnetomotive force thereto in the ZERO direction. This force generates a digit field which has a field intensity $H_d$ which is sufficient to maintain a previously initiated switching operation but is insufficient of itself to initiate such an operation. Accordingly, the current $I_d$ in lead 18′ does not switch the segment 8′.

In FIG. 3C an interrogation solenoid 24′ applies a current $I_b$ for generating a field in substantially only the segment portion 27′ with an intensity $H_c$ in the ZERO direction. Consequently, flux in the segment portion 27′ is switched to the ZERO condition, and under the influence of the digit field current in lead 18′ the walls of the switched domain of magnetization are expanded in both directions toward the ends of wire segment 8′ until the entire portion of the segment which is under digit wire 18′ is switched to the ZERO condition as indicated in FIG. 3D. This final condition is stable even though the digit field and the interrogation field are removed as shown in FIG. 3D; but the reversed magnetization of segment 27′ only, without subsequent expansion in the digit wire 18′ field, is unstable. Thus, a coincidence of the two fields is necessary to produce a stable reversal of magnetization.

Now interrogation pulses may be applied to solenoid 24′ in FIG. 3C for nondestructively determining the condition of the segment 8′ in the same manner previously described in connection with FIG. 1. Since interrogation zone 27′ has an unstable length, it returns to the condition of the rest of segment 8' upon removal of the interrogation field. During such interrogation operations the digit lead 18' serves the function of the sensing lead 18. Thus the only leads required for both writing in and reading out in accordance with the invention are the digit lead and the interrogation lead. No separate write-in winding, access matrix, and associated circuit connections are required. A magnetic wire having re-entrant characteristics has been considered in this example for illustrative purposes only. Any magnetic member, including thin magnetic film elements or tapes, having the required re-entrant characteristic could also be used.

In one circuit constructed to perform as described in connection with FIGS. 3A–3E, 4–79 molybdenum permalloy wire was used for magnetic wire 8'. That wire was 0.002 inch in diameter and was wrapped at a forty-five degree pitch with copper wire (digit lead 18') having a diameter of 0.002 inch. In that environment the minimum stable bit length was 0.5 inch. Digit lead current for writing was in the 30 milliampere range. Interrogation solenoid 24' had a width of 1/16 inch, and current of two amperes was used therein for both writing and reading. On interrogation of a ONE bit a signal of about 15 millivolts was generated in the digit lead 18' as the read-out signal available for utilization.

FIG. 4 shows a two-by-two coordinate array of magnetic memory elements arranged in rows and columns and utilizing the concepts just described in connection with FIGS. 2 and 3. The array illustrated is word oriented for reading and is adapted for serial bit writing; but other modes of operation may be easily provided by well known modification of control circuits. Two rows of storage elements are illustrated and include two magnetic wires 30 and 31 of the type employed in FIG. 3C around which are helically wound digit leads 32 and 33 which correspond to lead 18' on FIG. 3C. The ends of the digit lead 32 are connected by means of copper leads 36 and 37 to a digit line pulser 38. In similar manner, the ends of the digit lead 33 are connected by leads 39 and 40 to another digit line pulser 41. The pulsers 38 and 41 may be of any suitable type for coupling either positive or negative pulses to digit leads 32 and 33.

Sensing amplifiers 42 and 43 have their inputs connected to the ends of digit leads 32 and 33, in parallel with the outputs from pulsers 38 and 41, respectively, to receive induced voltages in digit leads 32 and 33, respectively, when those leads are functioning as sensing circuits.

Buffer solenoids 46, 47, and 48 are connected in series to receive signals from a buffer signal circuit 49 to define buffer regions marking the limits of adjacent bit elements, or segments, in the magnetic wires. The buffer solenoids and the circuit 49 are adapted to produce in the buffer regions of the magnetic wires 30 and 31 a magnetic field in opposition to the field generated by current in the energized digit lead and having approximately the intensity $H_d$ for the material. The buffer signals may be either direct current or pulse signals. The use of pulse buffer signals is more economical in power in semipermanent memories with frequent interrogations but infrequent write-in operations since such buffer signals are required only during write-in operations. If the array is to be used for parallel write-in of an entire word at a time, each buffer solenoid can be split into two straps for establishing in each buffer region two oppositely polarized buffer fields.

Interrogation, or word, solenoids 50 and 51 are provided and engage only small portions of the bit segments on the magnetic wires 30 and 31. Solenoid 50 engages one segment of each of the wires, and solenoid 51 engages a different segment on each of the wires. Interrogation regions engaged by these solenoids are of such length that they are magnetically unstable as previously mentioned. The rest of each bit element is magnetically stable and can maintain either condition of remanent flux in the absence of an applied field and independently of the condition of adjacent bit elements. The external circuits employed to drive the two-by-two array described thus far in connection with FIG. 4 are somewhat similar to those already known in the art for operating linear-selection memories. Examples of such operating circuits are shown and discussed in chapter 24 of "Digital Applications of Magnetic Devices," edited by A. J. Meyerhoff, G. H. Barnes, S. B. Disson, and G. E. Lund, and published in 1960 by John Wiley & Sons, Inc., New York. There are, however, some important differences in the signals supplied due to the novel memory element operating method of the present invention. These differences will be subsequently noted.

Briefly, the external operating circuits used in connection with the memory array of FIG. 4 operate in response to signals received from a data processor 52 which supplies necessary timing for writing in and for reading out as well as supplying information to be stored in the array and all address signals required. During write-in operations the processor supplies to a word selection control circuit 53 signals representing the information to be stored and the address code of the particular word solenoid that is to be activated for each bit. Circuit 53 translates those signals into pulses of the appropriate polarity and applies those pulses to select the appropriate cross-point of a selection pulse generating matrix 56. The latter network responds thereto by producing a pulse of the appropriate polarity and amplitude to generate under the corresponding word solenoid in the interrogation regions of all magnetic wires to which it is coupled a feld of minimum intensity equal to the threshold intensity $H_c$ for the material. In all of the magnetic wires, interrogation regions coupled to the energized solenoid are switched to conform to the polarity of the field $H_c$, but the switching does not expand to a full bit element in the absence of the field $H_d$ generated by the digit circuit.

At the same time that the interrogation solenoid is being activated, the processor 52 applies similar signals, write-in information and digit address, to a digit selection control 57 which activates individual digit pulsers 38 and 41, which then produce on the appropriate digit lead 32 or 33 a current pulse of proper magnitude and polarity to cooperate with the interrogation field and expand the new condition of the interrogation region of magnetic wire under one digit lead to the entire corresponding bit element. In other words, a digit pulser 38 or 41 generates a pulse capable of producing a digit field at least of the intensity $H_d$, but not up to the intensity $H_c$; and this pulse is applied to only one of the digit leads 32 or 33. The two pulses, those from the word and digit controls, produce the desired information storage in the desired location; but neither is adequate to create any significant disturbance in other storage locations. The word pulse is applied over such a small region that it affects no other locations than those to which it is coupled, and for the reasons previously pointed out in connection with FIG. 3 the word pulse has no permanent effect except in the one wire which is also simultaneously subjected to the expanding field $H_d$ generated by the digit pulse. An individual digit pulse is applied to only one digit lead and can affect no other, and within the affected lead the field is insufficient to initiate any switching operations so it is effective in only the single bit element region which is simultaneously being influenced by the word pulse.

Word, or write-in, timing is also applied from the processor 52 through a circuit 59 to activate the buffer pulser 49. The buffer pulser 49 produces a current in the buffer solenoids in a direction to produce a buffer field that opposes the digit field and prevents switch expansion beyond a particular bit element in which information is to be stored. Each buffer pulse is initiated at about the same time as the write-in and persists for at least as long as a digit lead pulse.

Read-out operations are accomplished in the system of FIG. 4 when the processor 52 applies interrogation signals comprising addresses and ZEROES to control circuit 53 for causing that circuit to interrogate the bit elements of a selected word by applying to the solenoids the same pulse that was used during writing operations to write a ZERO. This operation produces in leads 32 and 33 signals which are a function of the stored information as has been previously described. The digit pulsers 38 and 41 are not activated at all during interrogation and neither is the buffer pulser 49. The interrogation timing signals from the processor 52 for the read-out operation are, however, applied to gates 79 and 80 for strobing the outputs of sensing amplifiers 42 and 43 in unison to obtain the output information for utilization.

In summary, the magnetic memory array of FIG. 4 may be characterized as a word organized memory with individual bit access for writing without destroying other bits of the word involved. Two groups of electric circuits having engagements with each of the bit storage elements of the magnetic material supply signals for generating the two types of magnetic fields needed for controlling the storage of information in the elements and the nondestructive extraction of information therefrom. The digit lines 32 and 33 are utilized during both the write-in and the read-out operations of the memory array. During the write-in operation they receive pulses from the digit line pulses 38 and 41 while the outputs from sensing amplifiers 42 and 43 are disabled by the lack of read-out timing to operate gates 79 and 80. During the read-out operations the digit line pulsers are disabled by the lack of write-in information and digit addresses, and signals induced in the leads 32 and 33 as a result of the temporary switching of any interrogation regions in magnetic wires 30 and 31 are coupled through the sensing amplifiers to gates 79 and 80. Those gates are strobed by read timing pulses to couple the sensed signals to information utilization circuits, not shown, during predetermined time controlled intervals.

The word solenoids 50 and 51 also serve double duty since they also are operative during both the write-in and read-out operations. During the write-in operation the pulses applied to these solenoids through the access matrix 56 initiate bit element switching operations in the interrogation region of the elements and those operations are then expanded by the cooperating digit line pulses which are applied to coincide in point of time with at least a portion of each of the pulses in solenoids 50 and 51. During the read-out operation the same type of pulses from processor 52 are applied through the same access circuits to the same solenoids 50 and 51 for temporarily switching to ZERO the interrogation regions of bit elements that are then in the ONE condition.

Figure 5:
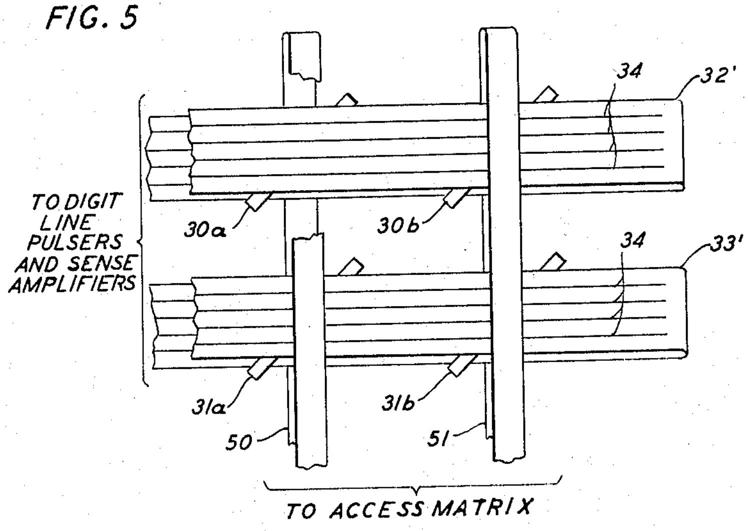
FIGS. 5 through 7 are schematic diagrams of different magnetic memory arrays also employing the invention.

In FIG. 5 there is shown a two-by-two portion of another magnetic memory array which in operation is essentially the same as that shown in FIG. 4 but which utilizes a type of structure that may in some cases present manufacturing advantages over the structure of FIG. 4. The magnetic storage medium in FIG. 5 takes the form of a plurality of individual bit segments 30*a*, 30*b*, 31*a*, and 31*b*. Continuous magnetic wires are not used; and, therefore, buffer circuits and solenoids are not required. The digit lines in FIG. 5 are changed from a helically wound lead to the form of broad, current-conducting straps 32' and 33' which have sufficient breadth in the direction transverse to current flow in the strap for covering substantially the entire length of the magnetic segments. Each strap has longitudinal slits 34 therein for reducing the effect of eddy currents. Interrogation solenoids 50 and 51 are provided as in FIG. 4 and intersect the straps 32' and 33' at the magnetic storage elements.

The manufacture of a memory array such as shown in FIG. 5 might be accomplished by depositing the magnetic elements as films upon a suitable substrate board, not shown, and then wrapping the digit line straps and the interrogation straps around the board in suitable locations for engaging the proper storage elements as shown in the drawing. This eliminates the need for special wire drawing operations and also permits the outgoing and return conductors of the straps to be close together so they present less inductive reactance to signals applied thereto. The operation of the array shown in FIG. 5 is essentially the same as that described in connection with FIG. 4 with the digit lines cooperating to supply write-in pulses during the write-in operation and serving as sense leads during the read-out operation. The interrogation solenoids also serve as previously described during both the write-in and read-out operations.

Figure 6:
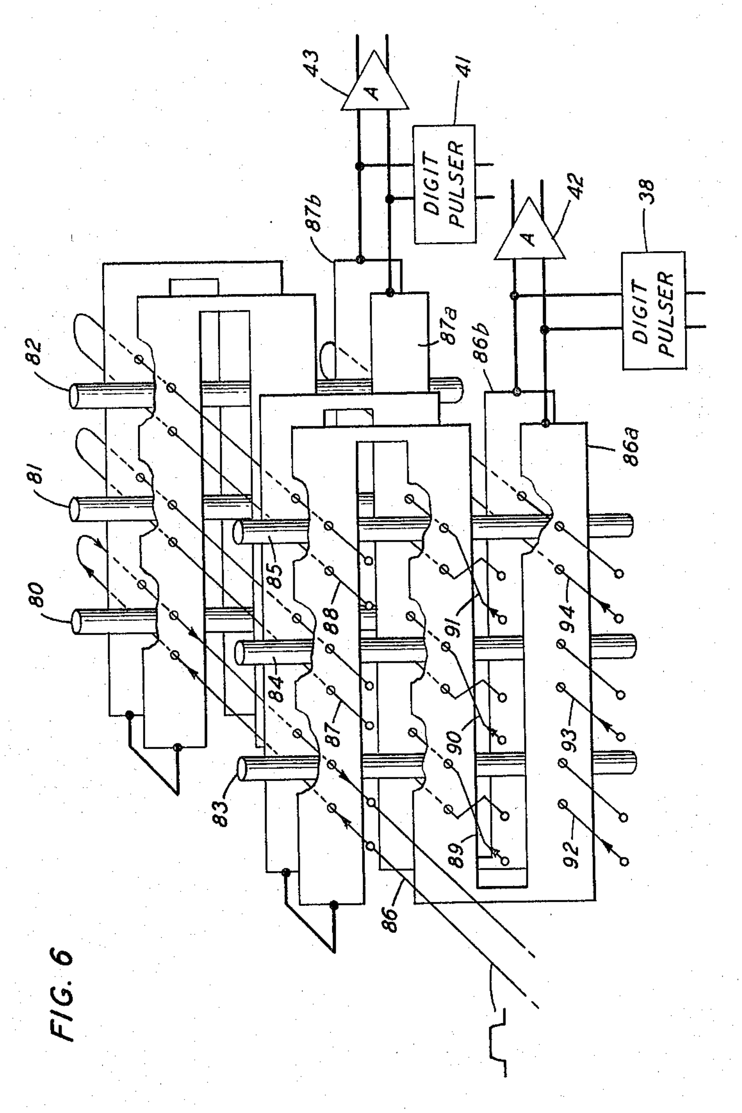

In FIG. 6 there is shown a three-by-three-by-two memory array utilizing the present invention with storage elements arranged in rows, columns, and elevations. In this embodiment the individual bit storage elements of the array comprise segments of magnetic wires 80 through 85 which correspond to the magnetic wires 30 and 31 of the two-by-two array in FIG. 4. Two digit lines are employed in this embodiment, and each includes a pair of interconnected zigzag current-conducting straps arranged to engage three of the magnetic wires in sandwich fashion. Thus, the series-connected zigzag straps 86*a* and 86*b* engage magnetic wires 83, 84, and 85 at three different elevations and are connected to the input of sensing amplifier 42 and to the output of digit line pulser 38. Similarly, the zigzag straps 87*a* and 87*b* are connected in series to engage magnetic wires 80, 81, and 82 with the ends of the series circuit connected to the input of sensing amplifier 43 and to the output of digit line pulser 41. Each of the zigzag straps has longitudinal slits along the current flow path to reduce eddy currents in the manner mentioned in connection with FIG. 5.

Interrogation circuits in the embodiment of FIG. 6 take the form of a plurality of leads 86 through 94. Each interrogation lead is threaded through the digit circuit straps and encloses two of the magnetic wires in different ones of the sandwich planes and is otherwise connected as shown in FIG. 4 for receiving pulses in sequence through an access matrix. The nine interrogation circuits 86 through 94 which are shown in FIG. 6 operate in essentially the same manner previously described in connection with the other embodiments. There is, however, one significant difference. Since the digit line circuits follow a zigzag path of engagement with magnetic wire segments, current flowing therein must necessarily flow in opposite sense with respect to alternate elevation groups of three wire segments. Thus, a digit line current flowing into the lower right-hand end of strap 86*a* tends to induce downward magnetization in the lower segments of wires 83, 84, and 85 since the current flows from right to left in the lower portion of the strap 86*a*. However, in the central portion of the strap the current flows from left to right and tends to induce upward magnetization in central segments of the same wires. In order to accommodate this difference, the connections for write-in circuits 89, 90, and 91 are reversed in polarity with respect to the connections of the write-in circuits in adjacent elevations. With this arrangement a binary ONE may be stored in the upper and lower segments of wire 83 as a downward condition of magnetization, while a binary ONE would be stored as upward magnetization in the central segment of wire 83. With this change, the matrix operates in the same fashion as previously described in connection with FIG. 4 insofar as the write-in and sensing circuits are concerned.

No buffer solenoids are required even though continuous magnetic wires with adjacent bit storage elements are employed because the digit line is in the form of a strap so that during a write-in operation the expansion of any switched domain is limited to portions of the magnetic wire covered by digit line portions cooperating with the particular interrogation solenoid which initiated the switching operation. Bit elements along the digit circuits can now be packed as closely together as the interaction between magnetic wires permits. The result is that the length, and consequently the delay and attenuation, in each digit circuit are correspondingly reduced.

Figure 7:
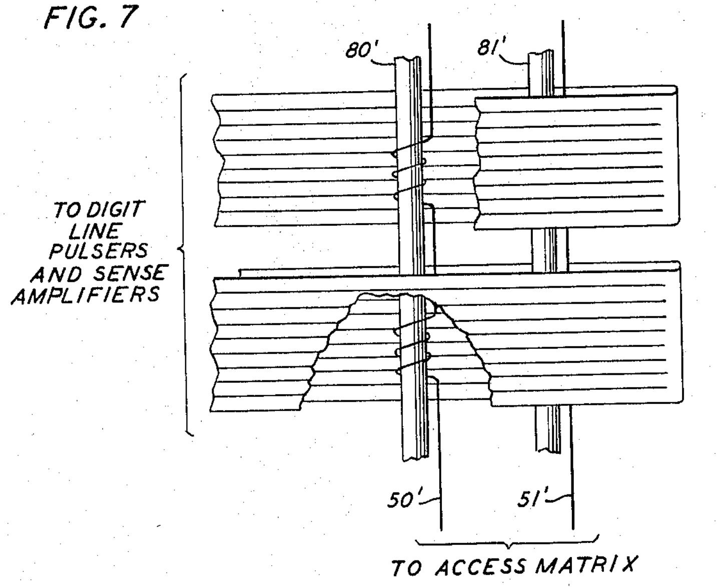

FIG. 7 shows still another form of memory array utilizing the present invention and which also gives the short interbit spacing along the digit line of FIG. 6, but that does not require threading of word lines. In this case a two-by-two portion of the array is shown. Continuous magnetic wires 80' and 81' are employed as in FIG. 6, and digit line straps are utilized. In this embodiment, however, the word solenoids 50' and 51' comprise circuits running essentially parallel to each magnetic wire but having electromagnetically engaging turns on such wire at only small portions thereof which are within wire zones engaged by the digit straps. The operation of the arrangement in FIG. 7 is otherwise the same as that described for previous embodiments with the digit line straps and the interrogation solenoids both serving dual functions by operating during both the write-in and read-out phases of memory operation.

Although the present invention has been described in relation to particular illustrative embodiments thereof, these are not to be taken as limitations on the application of the underlying principles of the invention. These principles may be employed in many different forms and embodiments which will be obvious to those skilled in the art; and such variations are, of course, included within the spirit and scope of the invention.

What is claimed is:

1. In combination, a wire of magnetic material having a principal, square-loop, hysteresis characteristic defining two stable conditions of magnetic remanence and having a first threshold field required to initiate switching between said stable conditions, said characteristic having re-entrant switching portions with a second and smaller threshold field required to maintain a switching operation, a lead wrapped around a length of said wire, means applying current to said lead for generating in said wire length a field which is at least equal to said second threshold field but less than said first threshold field, a circuit electromagnetically engaging a small segment of said wire length, and means applying to said circuit a pulse for generating a field in said segment which is at least equal to said first field, the length of said segment being proportioned in relation to the magnitude of said pulse so that a magnetic domain nucleated by the field of said pulse is unstable unless expanded by the field of said current.

2. In combination, a magnetic member having in portions thereof in excess of a predetermined minimum length two stable conditions of magnetization of opposite polarity, said member being unstable in portions of lesser length to maintain a magnetization polarity different from adjacent portions of said member, means applying to one of said magnetically unstable portions of said member a magnetomotive force adapted to magnetize only such portion in a selected direction, and means applying to a magnetically stable portion of said member, including said unstable portion, a magnetomotive force adapted to expand the mentioned magnetization of said unstable portion throughout said stable portion.

3. In a magnetic storage circuit into which information may be written and thereafter nondestructively read out, a magnetic member having two stable conditions of magnetic remanence, said conditions being stable in only portions of said member in excess of predetermined dimension, and in smaller portions said member being unstable to the extent that it cannot maintain a magnetization polarity different from the rest of said member in the absence of a corresponding magnetomotive force, first and second electric current conductors electromagnetically coupled to different sized portions of said member, said first conductor being coupled to one of said smaller portions and said second conductor being coupled to substantially all of said member, a source of pulses of sufficient magnitude in said first conductor to switch the portion of said member coupled thereto between said stable conditions, means applying said pulses to said first conductor during both write-in and read-out operations in said circuit, means controlling the polarity of selected ones of said pulses during said write-in operation, said controlling means also energizing said second conductor during said write-in operation to generate in said member a magnetic field to switch the remaining portions of said member to the same condition as the portion thereof that is coupled to said first conductor, output circuit means receiving signals from said second conductor, and said controlling means enabling said output circuit means during said read-out operation only.

4. The magnetic storage circuit in accordance with claim 3 in which said pulses are of sufficient magnitude to reverse the polarity of magnetization in said one smaller portion only, and said controlling means in energizing said second conductor applies thereto pulses of sufficient magnitude to expand the magnetization reversal from said one smaller portion to the balance of said member but insufficient magnitude to initiate such a reversal.

5. In a magnetic storage circuit, at least one magnetic member having a rectangular hysteresis characteristic defining two conditions of stable magnetic remanence and having significant re-entrant portions in said characteristic such that the magnetic field $H_c$ required to initiate a switching operation is significantly larger than the magnetic field $H_d$ which is required thereafter to continue such switching operation to completion, said member also having dimensions of sufficient size so that either of said stable conditions may be maintained in the absence of an applied magnetic field, means applying to a portion of said member a first magnetic field of sufficient intensity to nucleate magnetic domain walls and thereby switch said portion but of insufficient intensity to switch the entirety of said member, said portion being too short to maintain a given magnetic condition different from the rest of said member in the absence of said field, and means applying to said member a second magnetic field which is at least equal to $H_d$ but is less than $H_c$ for expanding magnetic domain walls nucleated by said first field.

6. The magnetic storage circuit in accordance with claim 5 in which said member is a piece of magnetic material having much greater length than width, said first field applying means includes an electric current conducting circuit engaging said member only in said portion thereof, and said second field applying means includes an electric circuit lead helically wrapped around said member along the entire length thereof.

7. The magnetic storage circuit in accordance with claim 5 in which said member is a piece of magnetic material having longitudinal dimension which is much greater than the width thereof, said first field applying means includes an electric circuit lead engaging only said portion, and said second field applying means includes an electric circuit strap of sufficient breadth transverse to the current flow path therethrough to cover substantially the entire length of said member.

8. The magnetic storage circuit in accordance with claim 5 in which a plurality of said members are provided in a coordinate array having a plurality of rows and columns, said first field applying means comprises a first group of electric circuits each engaging all of said members in a different column of said array, and said second field applying means comprises a second group of electric circuits each engaging all of said members in a different row of said array whereby the switching of any one of said members can be completed only by the presence in column and row circuits intersecting at such member of signals generating said first and second fields.

9. The magnetic storage circuit in accordance with claim 8 in which said members are separate elongated magnetic members, and the circuits of said second group are electric current conducting straps coupled to the members of said rows, each of said straps having sufficient breadth transverse to the current path therein to cover substantially the entire length of one of said members.

10. The magnetic storage circuit in accordance with claim 8 which comprises in addition means activating the circuits of said first group individually, means controlling the polarity of fields produced by said first field applying means during selected intervals, means responsive to said controlling means simultaneously controlling the polarity of fields produced by said second field applying means in all of said elements during said selected intervals, and means enabled during nonselected time intervals receiving signals induced in said second group of circuits in response to switching operations in said small portion of each of said elements.

11. The magnetic storage circuit in accordance with claim 8 in which said members are adjacent segments of elongated magnetic pieces, each piece including a plurality of such segments, and each of said segments being adapted to maintain either of said stable conditions independently of the condition of adjacent segments in the absence of applied magnetomotive forces.

12. The magnetic storage circuit in accordance with claim 11 in which each of said pieces includes the segments comprising the members of one said columns, and each circuit of said second group is an electric current conducting strap having sufficient breadth transverse to the current path therein to cover substantially the entire length of one of said segments whereby the influence of said second field is restricted to segments covered by the strap carrying the field-generating current.

13. The magnetic storage circuit in accordance with claim 11 in which each of said pieces includes the segments comprising the members of one of said rows.

14. The magnetic storage circuit in accordance with claim 13 in which each of the circuits of said second group includes a lead wrapped around substantially the entire length of a different one of said pieces, and a buffer circuit engages each of said pieces at points between adjacent ones of said segments for applying signals to restrict said domain wall expansion.

15. The magnetic storage circuit in accordance with claim 8 in which additional pluralities of said members are provided with additional first and second field applying means to form a three-dimensional array wherein the magnetic members are also arrayed in elevations as well as rows and columns, and said second group of electric circuits of corresponding rows of said elevations are connected together in a single row circuit.

16. The magnetic storage circuit in accordance with claim 15 in which each of said single row circuits comprises two zigzag current conducting straps sandwiching the elements of its row in all of said elevations.

17. The magnetic storage circuit in accordance with claim 16 in which said members are adjacent segments of elongated magnetic pieces, each piece including a plurality of said segments, each of said pieces including for each coordinate row-column location the members of all elevations.

18. In a magnetic storage circuit comprising a coordinate array of magnetic storage members, each member being characterized in that it has two stable remanent magnetic flux conditions of opposite polarity in portions thereof which are at least equal to a predetermined minimum length, portions less than said length being unable to maintain a stable magnetic condition which is different from the rest of such member in the absence of an externally applied coercive force, said members being further characterized in that a first minimum magnetic field intensity $H_c$ is required to initiate a switch between said stable conditions and a lesser minimum magnetic field $H_d$ is required to continue the switching operation to completion throughout the member, a first group of column circuits in which each circuit is magnetically coupled to only an unstable portion of each of the storage members of a different column of said array, means applying pulses of opposite polarities selectively to a part of said first group of column circuits for switching unstable member portions engaged thereby to different ones of said stable conditions corresponding to said opposite polarities, respectively, a second group of row circuits in which each circuit is magnetically coupled to a stable length of each of the members of a different row of said array, and means applying to a selected part of said second group of row circuits a pulse of predetermined polarity in at least partial time coincidence with a pulse of a predetermined one of said opposite polarities and adapted to cooperate with such first group pulse to expand the magnetic condition in the unstable portion of the selected member to an entire stable portion thereof.

References Cited by the Examiner

UNITED STATES PATENTS

| | | | |
|---|---|---|---|
| 3,067,408 | 12/1962 | Barrett | 304—174 |
| 3,092,812 | 6/1963 | Rossing | 340—174 |
| 3,105,226 | 9/1963 | Bobeck | 340—174 |

OTHER REFERENCES

Publication: Ferromagnetism by R. M. Bozorth, pp. 494–497.

BERNARD KONICK, *Primary Examiner.*

IRVING SRAGOW, *Examiner.*

M. S. GITTES, R. J. McCLOSKEY, *Assistant Examiners.*